(12) United States Patent
Maruyama et al.

(10) Patent No.: US 11,081,015 B2
(45) Date of Patent: Aug. 3, 2021

(54) TRAINING DEVICE, TRAINING METHOD, AND PROGRAM

(71) Applicant: Seiko Epson Corporation, Tokyo (JP)

(72) Inventors: Yuya Maruyama, Chino (JP); Hideki Tanaka, Chino (JP)

(73) Assignee: Seiko Epson Corporation

( * ) Notice: Subject to any disclaimer, the term of this patent is extended or adjusted under 35 U.S.C. 154(b) by 332 days.

(21) Appl. No.: 15/430,798

(22) Filed: Feb. 13, 2017

(65) Prior Publication Data

US 2017/0243499 A1   Aug. 24, 2017

(30) Foreign Application Priority Data

Feb. 23, 2016 (JP) .............................. JP2016-031555

(51) Int. Cl.
| | |
|---|---|
| *G09B 5/02* | (2006.01) |
| *G06F 3/01* | (2006.01) |
| *G09B 23/28* | (2006.01) |
| *G02B 27/01* | (2006.01) |

(52) U.S. Cl.
CPC .............. *G09B 5/02* (2013.01); *G06F 3/015* (2013.01); *G09B 23/28* (2013.01); *G02B 27/017* (2013.01); *G02B 2027/014* (2013.01); *G02B 2027/0178* (2013.01)

(58) Field of Classification Search
CPC ........ G09B 5/02; G09B 23/28; G09B 27/017; G06F 3/015; G02B 2027/014; G02B 2027/0178
USPC ........................................................ 434/308
See application file for complete search history.

(56) References Cited

U.S. PATENT DOCUMENTS

| | | | | |
|---|---|---|---|---|
| 5,692,571 | A * | 12/1997 | Jackson | A62C 3/0214 169/16 |
| 6,972,734 | B1 | 12/2005 | Ohshima et al. | |
| 2011/0071416 | A1* | 3/2011 | Terada | A61B 5/0478 600/544 |
| 2013/0201182 | A1* | 8/2013 | Kuroki | G06T 19/20 345/419 |
| 2014/0186002 | A1 | 7/2014 | Hanaya et al. | |

(Continued)

FOREIGN PATENT DOCUMENTS

| | | |
|---|---|---|
| JP | 2000-353248 A | 12/2000 |
| JP | 2007-020835 A | 2/2007 |

(Continued)

OTHER PUBLICATIONS

Indovina, I., & Sanes, J. N. (2001). On Somatotopic Representation Centers for Finger Movements in Human Primary Motor Cortex and Supplementary Motor Area. NeuroImage, 13(6), 1027-1034. (Year: 2001).*

(Continued)

*Primary Examiner* — James B Hull
*Assistant Examiner* — Lily M Del Valle
(74) *Attorney, Agent, or Firm* — Harness, Dickey & Pierce, P.L.C.

(57) ABSTRACT

A training device, which is used to cause a user to be trained to operate an extra part based on a measurement result of user's brain activity, notifies the user of information indicating a degree of activation of a brain area corresponding to the extra part, as information indicating the state of the brain activity of the user who imagines trying to operate the extra part.

7 Claims, 14 Drawing Sheets

(56) References Cited

U.S. PATENT DOCUMENTS

| | | | |
|---|---|---|---|
| 2014/0200432 A1* | 7/2014 | Banerji | A61B 5/0488 |
| | | | 600/383 |
| 2014/0306866 A1 | 10/2014 | Miller et al. | |
| 2015/0234462 A1 | 8/2015 | Miller et al. | |
| 2015/0234463 A1 | 8/2015 | Miller et al. | |
| 2015/0235429 A1 | 8/2015 | Miller et al. | |
| 2015/0235433 A1 | 8/2015 | Miller et al. | |
| 2015/0235435 A1 | 8/2015 | Miller et al. | |
| 2015/0235610 A1 | 8/2015 | Miller et al. | |
| 2015/0293362 A1* | 10/2015 | Takahashi | G06F 3/147 |
| | | | 348/47 |
| 2015/0346810 A1* | 12/2015 | Urbach | G06F 3/013 |
| | | | 345/156 |
| 2016/0073916 A1* | 3/2016 | Aksenova | A61B 5/7246 |
| | | | 600/409 |
| 2016/0077547 A1* | 3/2016 | Aimone | G06F 3/012 |
| | | | 345/8 |
| 2016/0103487 A1* | 4/2016 | Crawford | G06F 3/015 |
| | | | 600/544 |
| 2016/0155474 A1 | 6/2016 | Hanaya et al. | |
| 2016/0232715 A1* | 8/2016 | Lee | A63F 13/00 |
| 2016/0235323 A1* | 8/2016 | Tadi | A61B 5/7285 |
| 2016/0267804 A1* | 9/2016 | Pemba | A63F 13/355 |
| 2016/0350972 A1* | 12/2016 | Kauffmann | G06T 19/006 |
| 2017/0199569 A1* | 7/2017 | Cruz-Hernandez | G06F 3/016 |
| 2018/0224936 A1* | 8/2018 | Tumey | G06F 3/011 |
| 2018/0239430 A1* | 8/2018 | Tadi | G02B 27/0172 |
| 2019/0073030 A1* | 3/2019 | Lee | G06F 3/015 |

FOREIGN PATENT DOCUMENTS

| | | |
|---|---|---|
| JP | 2009-297059 A | 12/2009 |
| JP | 2010-198233 A | 9/2010 |
| JP | 2014-127987 A | 7/2014 |
| WO | WO-2014-164901 A1 | 10/2014 |

OTHER PUBLICATIONS

J. Decety et al., "Possible Involvement of Primary Motor Cortex in Mentally Simulated Movement: A Functional Magnetic Resonance Imaging Study", Rapid Science Publishers, Cognitive Neuroscience, vol. 7, No. 7, May 17, 1996, pp. 1279-1284.

B. Llorens et al., "Demonstration-Based Control of Supernumerary Robotic Limbs", IEEE/RSJ International Conference on Intelligent Robots and Systems, Oct. 7-12, 2012, pp. 3936-3942.

* cited by examiner

TRAINING DEVICE, TRAINING METHOD, AND PROGRAM

BACKGROUND

1. Technical Field

The present invention relates to training for manipulating an extra part by brain activity.

2. Related Art

A system is known which detects a user's intention from brain information acquired by a brain activity measurement device and sends an intention identifier for identifying the intention to a robot so as to operate the robot (JP-A-2010-198233).

In the related art, a robot remote from the user is to be operated. On the other hand, an extra part may be subjected to an operation. The extra part is an actuator mounted on the user's body and acting as if it is a part of the user's body. When the extra part is operated according to a degree of activation of a brain area corresponding to the extra part, if the user can freely control the degree of activation, the operation will be more accurate. However, when the progress and effect of training is checked using the actual extra part, it takes time and effort for the work.

SUMMARY

An advantage of some aspects of the invention is to check the progress and effect of training of operating an extra part by user's brain activity, without using an actual extra part.

The advantage can be achieved by the following configurations.

An aspect of the invention provides a training device used to cause a user to be trained to operate an extra part based on a measurement result of user's brain activity. The training device includes a notification unit that notifies the user of information indicating a degree of activation of a brain area corresponding to the extra part, as information indicating the state of the brain of the user who imagines trying to operate the extra part. According to this aspect, it is possible to determine the progress and effect of training, without using an actual extra part.

The training device may further include a display unit that displays information indicating the degree of activation, as the notification unit. With this configuration, the user can view the degree of activation.

The training device may be a head mounted display, and the display unit may allow the user to view a virtual image. With this configuration, it is possible to perform training using display of a virtual image by the head mounted display device.

In the training device, the display unit may allow the user to view an image on which the extra part is operating. With this configuration, it is possible to train to manipulate an extra part by user's brain activity. Specifically, the user can perform the training by considering that the action is realized by the user's imagination while viewing the image on which the extra part is operating.

In the training device, the display unit may display, as the image, a first image that is an image from a first person viewpoint and a second image that is an image from a third person viewpoint. With this configuration, training can be effectively performed by using images of different viewpoints.

The training device may be a transparent head mounted display; and the first image may be an image in which the extra part appears to be disposed relative to the user's actual body. With this configuration, the user obtains information indicating the degree of activation, and feels realistic when viewing the operation of the extra part. In particular, when viewing an image in which the extra part is operating, the user's brain is likely to recognize the extra part as a part of the body, and the above training can be effectively performed.

The training device may cause the user to view an image in which the extra part appears to apply stimulation, when the stimulation is applied to at least one of the tactile organ and the auditory organ of the user. With this configuration, illusion feeling can be given to the user's brain, and in turn, training can be performed effectively, by giving the user stronger augmented reality. The illusion used herein is to feel as if there is an actual extra part.

The invention can be realized in various forms other than the above. For example, the invention can be realized in the form of a training method, a program for realizing the method, a non-temporary storage medium storing the program, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
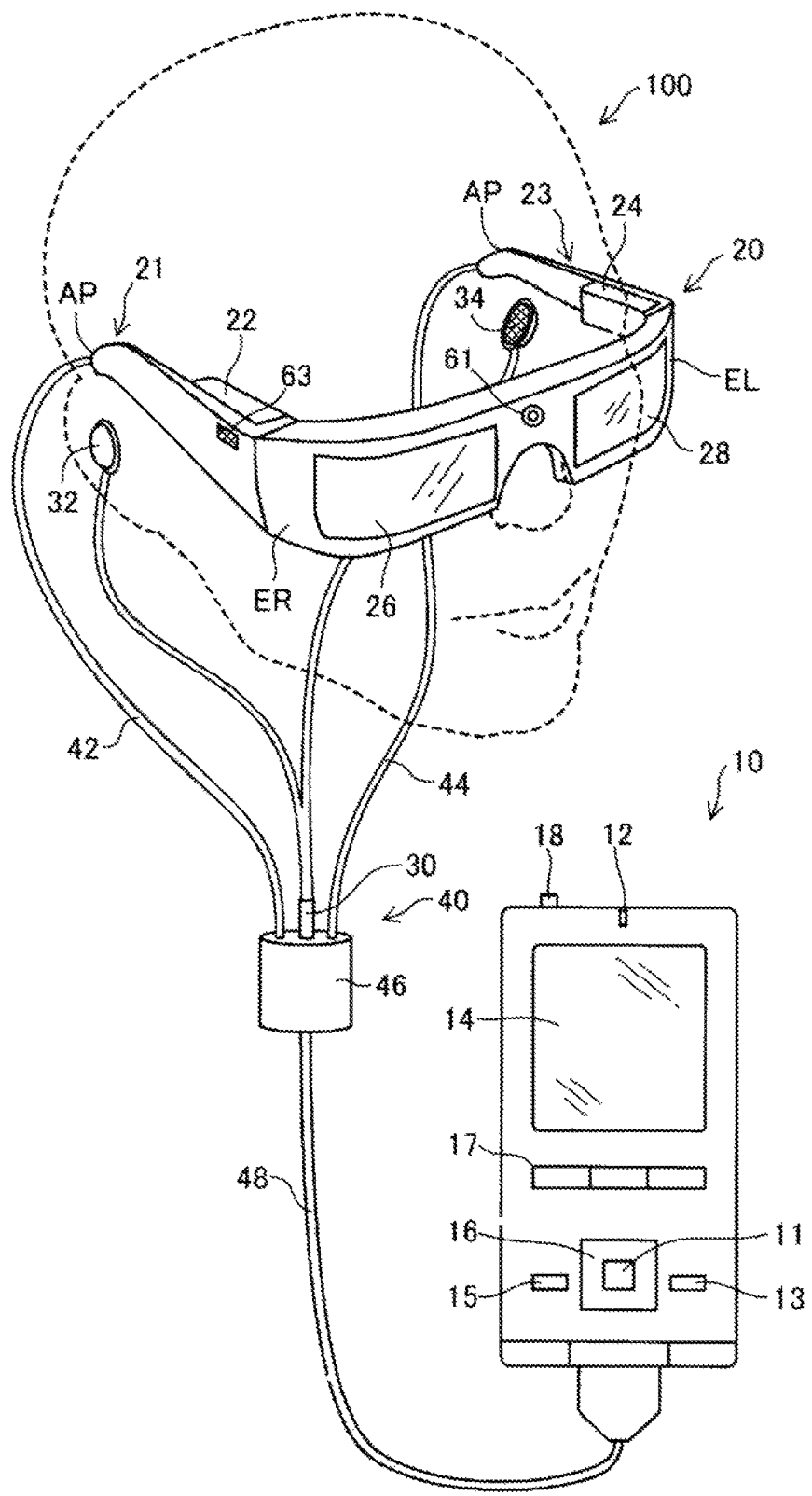
FIG. 1 is an external view of an HMD.

FIG. 1 illustrates an external view of an HMD 100. The HMD 100 is a head mounted display (HMD). The HMD 100 is an optically transparent type device that allows a user to view a virtual image and to simultaneously directly view an outside view. The HMD 100 functions as a training device for the first and second training processes (described later).

In this specification, a virtual image viewed by the user by the HMD 100 is also referred to as a "display image" for convenience. The display image is a moving image in the present embodiment.

The HMD 100 includes an image display unit 20 for allowing a user to view a virtual image in a state of being mounted on the head of a user, and a controller 10 for controlling the image display unit 20.

The image display unit 20 is a wearing object to be worn on the head of the user, and has a spectacle shape in the present embodiment. The image display unit 20 includes a right holding unit 21, a right display driving unit 22, a left holding unit 23, a left display driving unit 24, a right optical image display unit 26, a left optical image display unit 28, a camera 61, and a microphone 63. The right optical image display unit 26 and the left optical image display unit 28 are respectively disposed immediately before the user's right and left eyes when the user wears the image display unit 20. The one end of the right optical image display unit 26 and the one end of the left optical image display unit 28 are connected to each other at a position corresponding to middle of the forehead of the user when the user wears the image display unit 20.

The right holding unit 21 is a member extending from the end ER which is the other end of the right optical image display unit 26 to a position corresponding to the temporal part of the user when the user wears the image display unit 20. Likewise, the left holding unit 23 is a member extending from the end EL which is the other end of the left optical image display unit 28 to a position corresponding to the temporal part of the user when the user wears the image display unit 20. The right holding unit 21 and the left holding unit 23 hold the image display unit 20 on the head of the user like a temple of glasses.

The right display driving unit 22 and the left display driving unit 24 are disposed on the side facing the head of the user when the user wears the image display unit 20. In the following description, the right display driving unit 22 and the left display driving unit 24 will be collectively and simply referred to as the "display driving unit", and the right optical image display unit 26 and the left optical image display unit 28 will be collectively and simply referred to as "optical image display unit".

The display driving units 22 and 24 include liquid crystal displays 241 and 242 (hereinafter, also referred to as "LCDs 241 and 242"), projection optical systems 251 and 252, and the like (see FIG. 2). Details of the configuration of the display driving units 22 and 24 will be described later. The optical image display units 26 and 28 as optical members include light guide plates 261 and 262 (see FIG. 2) and a light control plate. The light guide plates 261 and 262 are formed of a light transparent resin material or the like, and guide the image light output from the display driving units 22 and 24 to the user's eyes. The light control plate is a thin plate-like optical element, and is disposed so as to cover the front side of the image display unit 20, which is the side opposite to the user's eye side. The light control plate protects the light guide plates 261 and 262, and suppresses damage to the light guide plates 261 and 262, attachment of dirt, and the like. Further, it is possible to adjust the easiness of visibility of virtual images by adjusting the amount of external light entering the eye of the user, by adjusting the light transmittance of the light control plate. The light control plate can be omitted.

The camera 61 is disposed at a position corresponding to the middle of the forehead of the user when the user wears the image display unit 20. Therefore, in a state in which the user wears the image display unit 20 on the head, the camera 61 captures the outside view and acquires the captured image. The outside view is the scenery outside the user's gaze direction. The camera 61 is a monocular camera. The camera 61 may be a stereo camera.

The microphone 63 acquires sound. The microphone 63 is disposed on the opposite side (outer side) of the side facing the user of the right display driving unit 22 when the user wears the image display unit 20.

The image display unit 20 further includes a connecting portion 40 connecting the image display unit 20 to the controller 10. The connecting portion 40 includes a main body cord 48, a right cord 42, a left cord 44, and a connecting member 46 which are connected to the controller 10. The right cord 42 and the left cord 44 are cords in which the body cord 48 is branched into two cords. The right cord 42 is inserted into the casing of the right holding unit 21 from the front end portion AP in the extending direction of the right holding unit 21 and is connected to the right display driving unit 22. Similarly, the left cord 44 is inserted into the casing of the left holding unit 23 from the front end portion AP in the extending direction of the left holding unit 23, and is connected to the left display driving unit 24. The connecting member 46 is provided at a branch point among the main body cord 48, the right cord 42, and the left cord 44, and has a jack for connecting the earphone plug 30. The right earphone 32 and the left earphone 34 extend from the earphone plug 30.

The image display unit 20 and the controller 10 transmit various signals through the connecting portion 40. Connectors (not illustrated) to be engaged with each other are respectively provided in the end portion on the opposite side of the connecting member 46 of the body cord 48 and the controller 10. The controller 10 and the image display unit are connected or disconnected by engaging/disengaging between the connector of the body cord 48 and the connector of the controller 10. For example, a metal cable or an optical fiber may be adopted for the right cord 42, the left cord 44, and the main body cord 48.

The controller 10 controls the HMD 100. The controller 10 includes a determination key 11, a lighting unit 12, a display switching key 13, a track pad 14, a brightness switching key 15, a direction key 16, a menu key 17, and a power switch 18. When a press operation of the determination key 11 is detected, a signal for determining the content operated by the controller 10 is output. The lighting unit 12 notifies of the operating state of the HMD 100 as its light emission state. Examples of the operating state of the HMD 100 include power supply ON/OFF. For example, an LED is used as the lighting unit 12. When a press operation of the display switching key 13 is detected, for example, a signal for switching the display mode of the content moving image to 3D or 2D is output. When the operation of the user's finger on the operation surface of the track pad 14 is detected, a signal corresponding to the detection content is output. Various track pads such as an electrostatic type, a pressure detection type, and an optical type may be adopted as the track pad 14. When a pressing operation of the brightness switching key 15 is detected, a signal for increasing or decreasing the brightness of the image display unit 20 is output. When a pressing operation corresponding to each of up, down, right, and left directions of the direction key 16 is detected, a signal corresponding to the detected contents is output. When the slide operation of the power switch 18 is detected, the power-on state of the HMD 100 is switched.

Figure 2:
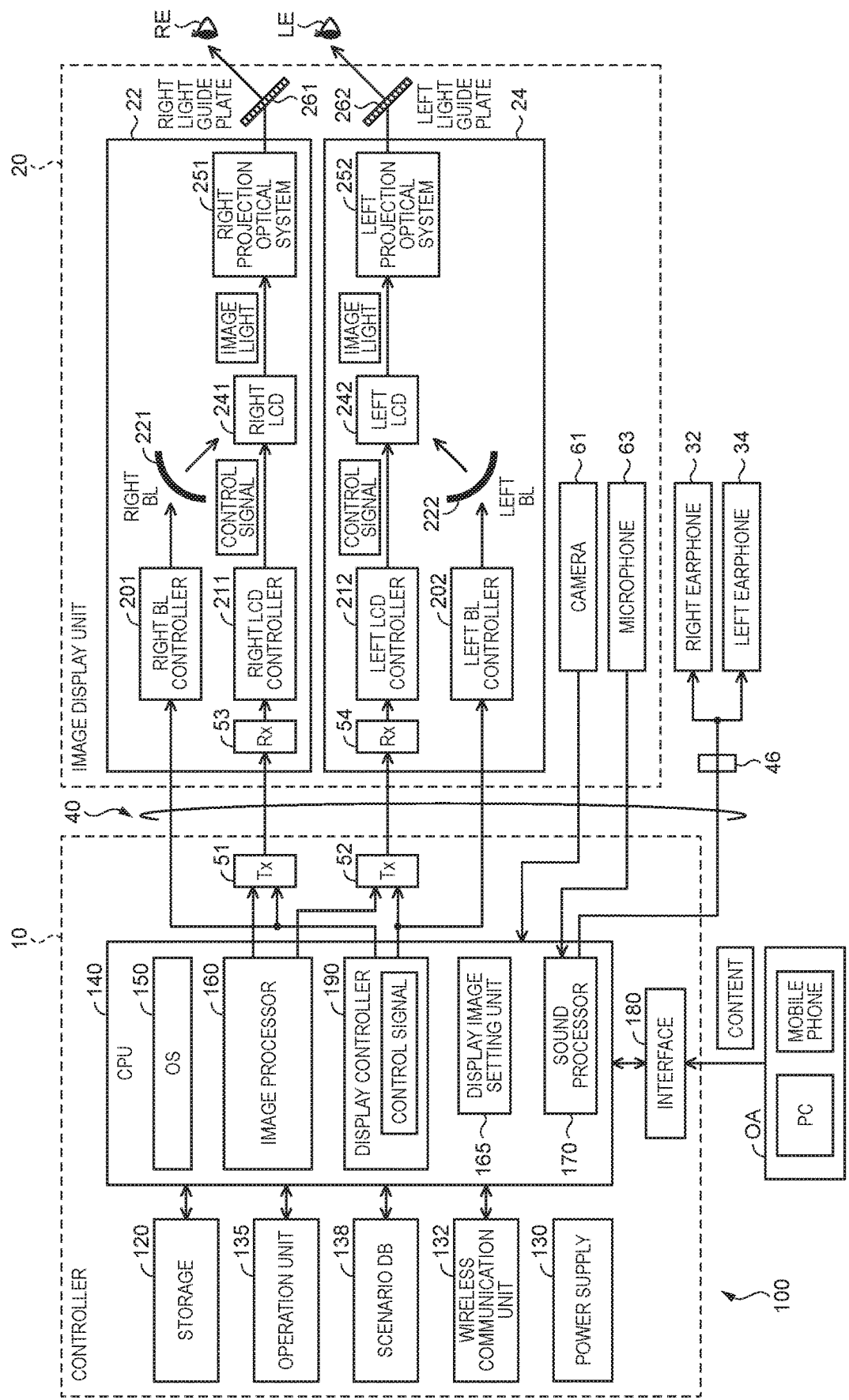
FIG. 2 is a block diagram functionally illustrating the configuration of the HMD.

FIG. 2 is a block diagram functionally illustrating the configuration of the HMD 100. As illustrated in FIG. 2, the controller 10 includes a storage 120, a power supply 130, an operation unit 135, a wireless communication unit 132, a scenario database 138 (scenario DB 138), a CPU 140, an interface 180, a transmission unit 51 (Tx 51) and the transmission unit 52 (Tx 52). The operation unit 135 receives an operation by the user. The operation unit 135 includes a determination key 11, a display switching key 13, a track pad 14, a brightness switching key 15, a direction key 16, a menu key 17, and a power switch 18.

The power supply 130 supplies power to each part of the HMD 100. For example, a secondary battery may be used as the power supply 130. The wireless communication unit 132 executes wireless communication with other devices such as, for example, a content server, a television, and a personal computer (PC), conforming to a predetermined wireless communication standard such as a wireless LAN or Bluetooth (registered trademark).

The storage 120 includes a ROM, a RAM, and the like. Various programs are stored in the ROM of the storage 120. The CPU 140, which will be described later, reads various programs from the ROM of the storage 120 and stores them in the RAM of the storage 120, thereby executing various programs.

The scenario DB 138 stores an AR scenario which is a plurality of moving images including an augmented reality (AR) image. The AR scenario in the present embodiment is a moving image including an AR image displayed on the image display unit 20 and a sound output through the earphones 32 and 34. Further, the HMD 100 can execute not only the AR scenario stored in the scenario DB 138, but also the AR scenario received from another device through the wireless communication unit 132.

The CPU 140 can control the operating system 150 (OS 150), the display controller 190, the sound processor 170, the image processor 160, and the display image setting unit 165 by reading out and executing the program stored in the ROM of the storage 120.

The display controller 190 generates control signals for controlling the right display driving unit 22 and the left display driving unit 24. Specifically, the display controller 190 controls the driving of the right LCD 241 by the right LCD controller 211, the driving of the right backlight 221 by the right backlight controller 201, the driving of the left LCD 242 by the left LCD controller 212, the driving of the left backlight 222 by the left backlight controller 202, or the like, in response to the control signal, respectively. Thus, the display controller 190 controls generation and emission of image light by the right display driving unit 22 and the left display driving unit 24, respectively. For example, the display controller 190 causes both the right display driving unit 22 and the left display driving unit 24 to generate image light, only one of them to generate image light, or both of them not to generate image light. Generating image light is also referred to as "displaying an image".

The display controller 190 transmits the control signals for the right LCD controller 211 and the left LCD controller 212 through the transmission units 51 and 52, respectively. In addition, the display controller 190 transmits control signals to the right backlight controller 201 and the left backlight controller 202, respectively.

The image processor 160 acquires an image signal included in the content, and transmits the acquired image signal to the reception units 53 and 54 of the image display unit 20 through the transmission units 51 and 52. The image processor 160 may perform image processes such as a resolution conversion process, various color tone correction processes such as brightness and saturation adjustment, a keystone correction process, and the like on the image data as necessary.

The sound processor 170 acquires a sound signal included in the content, amplifies the acquired sound signal, and supplies the amplified sound signal to the speaker (not illustrated) in the right earphone 32 and the speaker (not illustrated) in the left earphone 34, connected to the connecting member 46. For example, when adopting the Dolby (registered trademark) system, the processes are performed on the sound signal, and for example, different sounds, whose frequencies and the like are changed, are output from the right earphone 32 and the left earphone 34, respectively. In addition, the sound processor 170 transmits the sound acquired by the microphone 63 to the display image setting unit 165 as a control signal.

The sound processor 170 outputs sounds based on the sound signals included in another AR scenario, through the earphones 32 and 34. The sound processor 170 outputs sounds based on the sound signals included in the AR scenario, through the earphones 32 and 34. The sound processor 170 executes various processes, based on the sound acquired from the microphone 63. For example, when options are included in the AR scenario, the sound processor 170 selects one option from the options based on the acquired sound.

The interface 180 is used to connect various external apparatuses OA which are content supply sources to the controller 10. Examples of the external apparatuses OA include a storage device that stores an AR scenario, a PC, a mobile phone, or the like. For example, a USB interface, a micro USB interface, a memory card interface, or the like may be used as the interface 180.

The image display unit 20 includes a right display driving unit 22, a left display driving unit 24, a right light guide plate 261 which is a right optical image display unit 26, a left light guide plate 262 which is a left optical image display unit 28, a camera 61, and a microphone 63.

The right display driving unit 22 includes a reception unit 53 (Rx 53), a right backlight controller 201 (right BL controller 201) and a right backlight 221 (right BL 221) which function as light sources, a right LCD controller 211 and a right LCD 241 which function as display elements, and a right projection optical system 251. The right backlight controller 201 and the right backlight 221 function as light sources. The right LCD controller 211 and the right LCD 241 function as display elements. The right backlight controller 201, the right LCD controller 211, the right backlight 221, and the right LCD 241 are collectively referred to as "image light generation unit".

The reception unit 53 functions as a receiver for serial transmission between the controller 10 and the image display unit 20. The right backlight controller 201 drives the right backlight 221 based on the input control signal. The right backlight 221 is, for example, a light emitter such as an LED or an electroluminescence (EL). The right LCD controller 211 drives the right LCD 241, based on the control signals transmitted from the image processor 160 and the display controller 190. The right LCD 241 is a transparent liquid crystal panel in which a plurality of pixels are arranged in a matrix.

The right projection optical system 251 is formed of a collimator lens that converts the image light emitted from the right LCD 241 into a parallel light flux. The right light guide plate 261 as the right optical image display unit 26 guides the image light output from the right projection optical system 251 to the user's right eye RE, while reflecting it along a predetermined optical path.

The left display driving unit 24 has the same configuration as that of the right display driving unit 22. The left display driving unit 24 includes a reception unit 54 (Rx 54), a left backlight controller 202 (left BL controller 202) and a left backlight 222 (left BL 222) which function as light sources, a left LCD controller 212 and a left LCD 242 which function as the display elements, and a left projection optical system 252. The left backlight controller 202 and the left backlight 222 function as light sources. The left LCD controller 212 and the left LCD 242 function as display elements. The left backlight controller 202, the left LCD controller 212, the left backlight 222, and the left LCD 242 are collectively referred to as "image light generation unit". Further, the left projection optical system 252 is formed of a collimator lens which converts the image light emitted from the left LCD 242 into a parallel light flux. The left light guide plate 262 as the left optical image display unit 28 guides the image light output from the left projection optical system 252 to the user's left eye LE, while reflecting it along a predetermined optical path.

Figure 3:
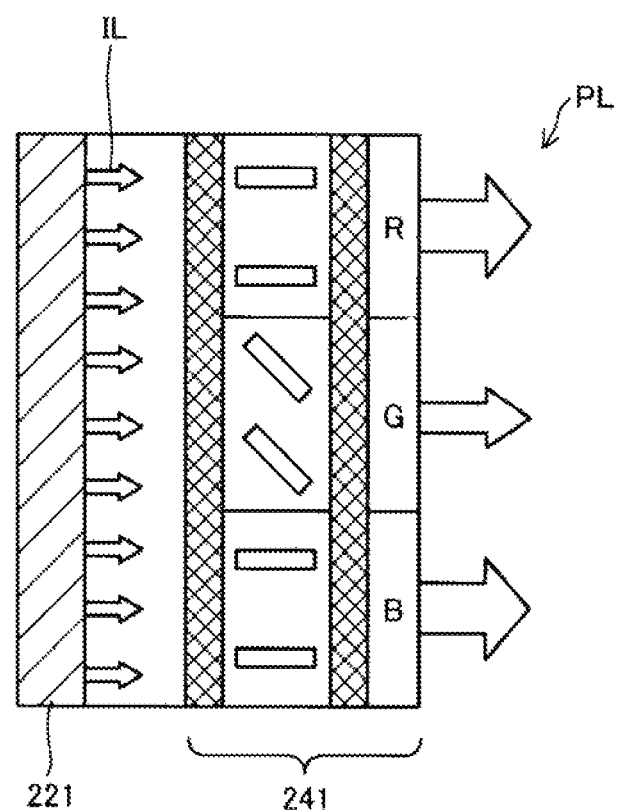
FIG. 3 is a diagram illustrating an aspect in which image light is emitted by an image light generation unit.

FIG. 3 illustrates an aspect in which image light is emitted by an image light generation unit. The right LCD 241 converts the illumination light IL emitted from the right backlight 221 into effective image light PL representing an image, by changing the transmittance of the light transmitted through the right LCD 241 by driving the liquid crystals at respective pixel positions arranged in a matrix. The same is applied to the left side. As described above, in the present embodiment, a backlight system is adopted. However, the image light may be emitted using the front light system or a reflection system.

Figure 4:
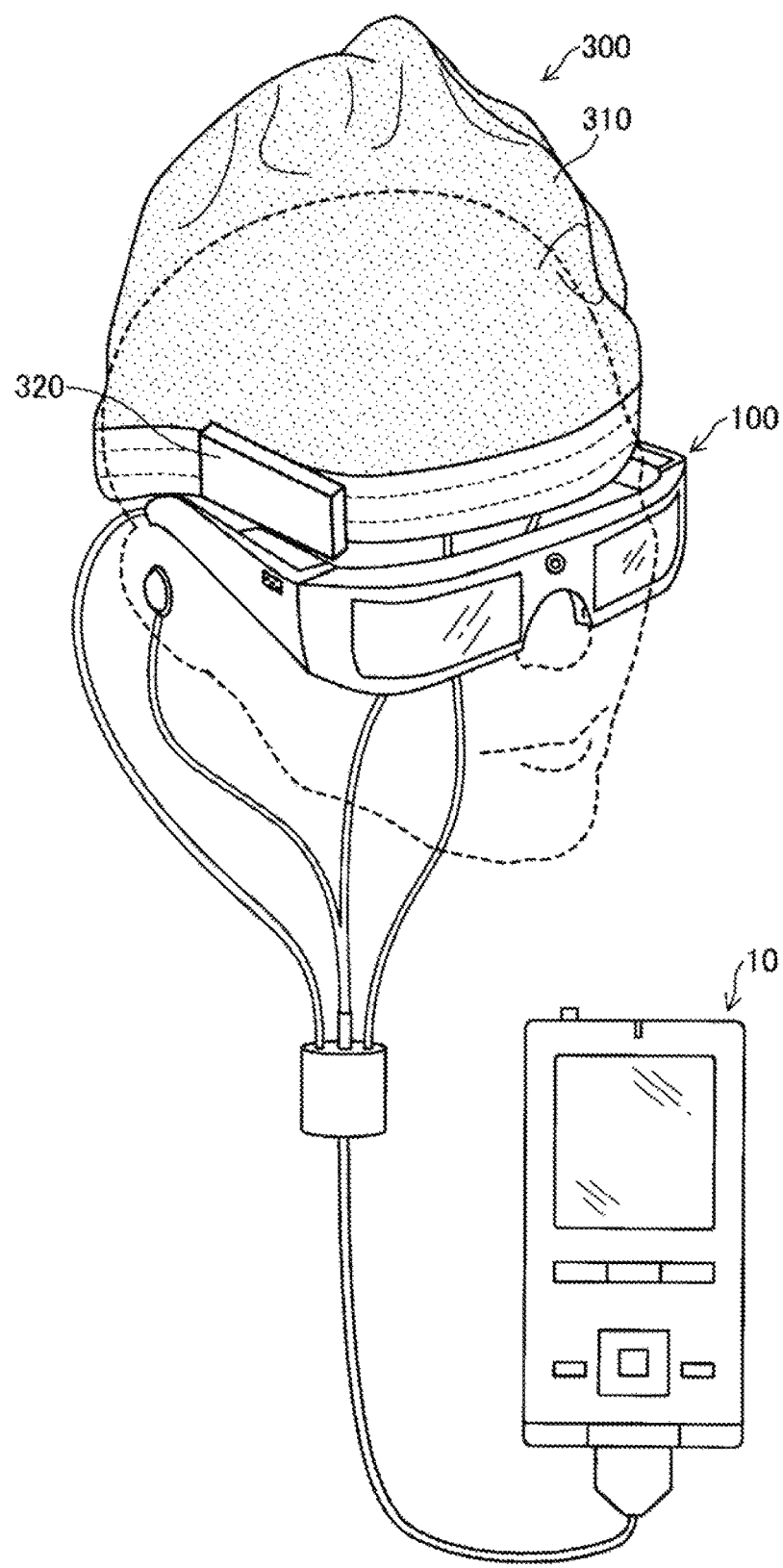
FIG. 4 is an external view of an electroencephalogram monitor.

FIG. 4 illustrates an external view of an electroencephalogram monitor 300. The electroencephalogram monitor 300 is used to acquire an electroencephalogram (EEG), and includes a sensor unit 310 and a detection circuit 320.

The sensor unit 310 has a shape like a hat and is attached to the user's head. In the sensor unit 310, a plurality of electrodes are disposed on the mounting surface. A variation in potential corresponding to the brain area having each electrode disposed is acquired from each electrode. The detection circuit 320 acquires and stores an electroencephalogram in each part where the electrode is disposed, by processing the acquired variation of the potential. The detection circuit 320 includes an interface (not illustrated) for outputting the stored electroencephalogram to an external device.

Figure 5:
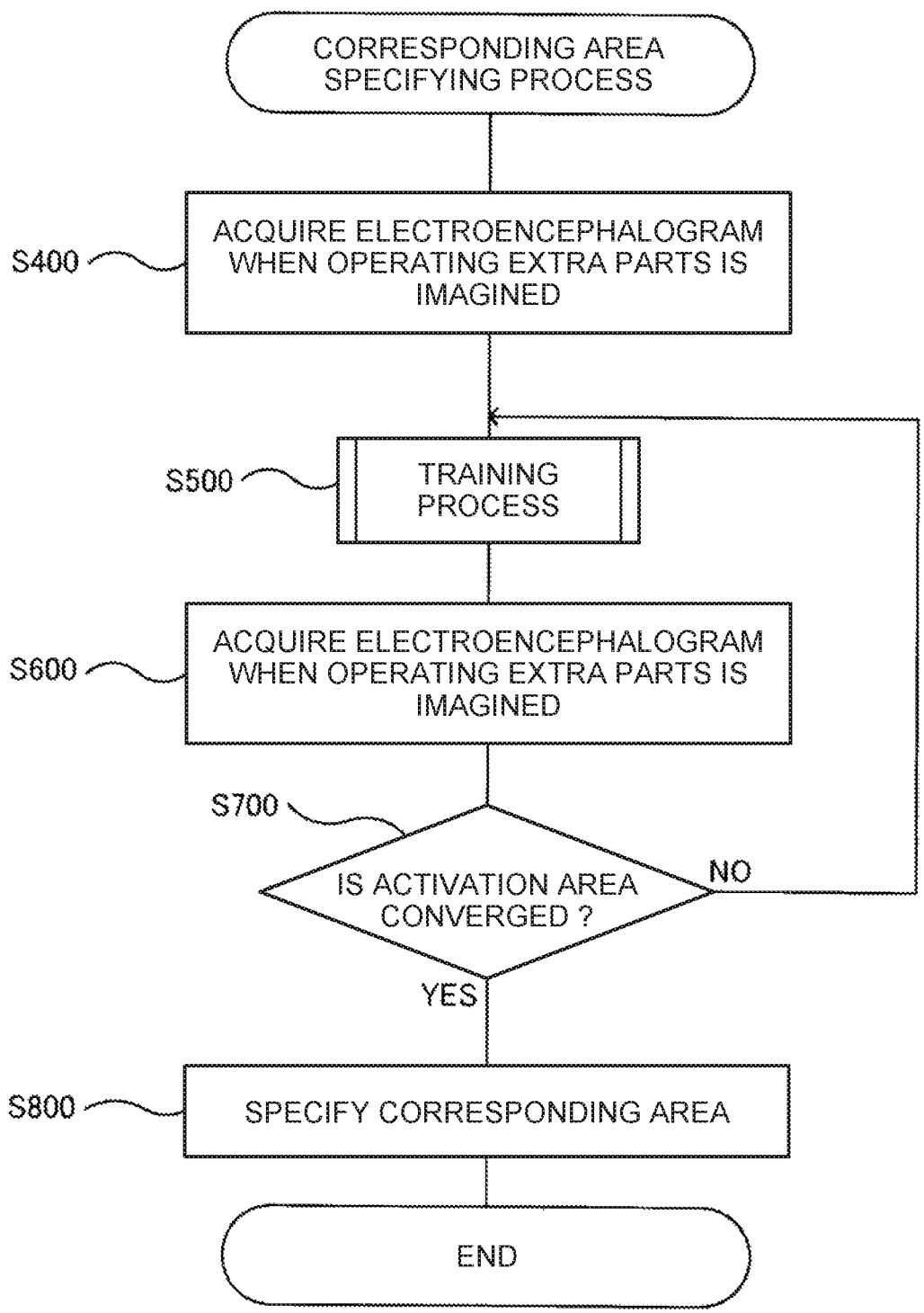
FIG. 5 is a flowchart illustrating a corresponding area specifying process.

FIG. 5 is a flowchart illustrating a procedure of a corresponding area specifying process. First, as a preliminary measurement procedure, an electroencephalogram of an examinee who is the user when the examinee imagines operating an extra part E (FIG. 6) with his/her own will is acquired (S400).

In S400, measurement by the electroencephalogram monitor 300 is used. In S400, display by the HMD 100 is not used. In other words, the HMD 100 may not be worn by the examinee, or nothing may be displayed in a state where the HMD 100 is worn by the examinee. S400 is executed to acquire an electroencephalogram before training.

Figure 6:
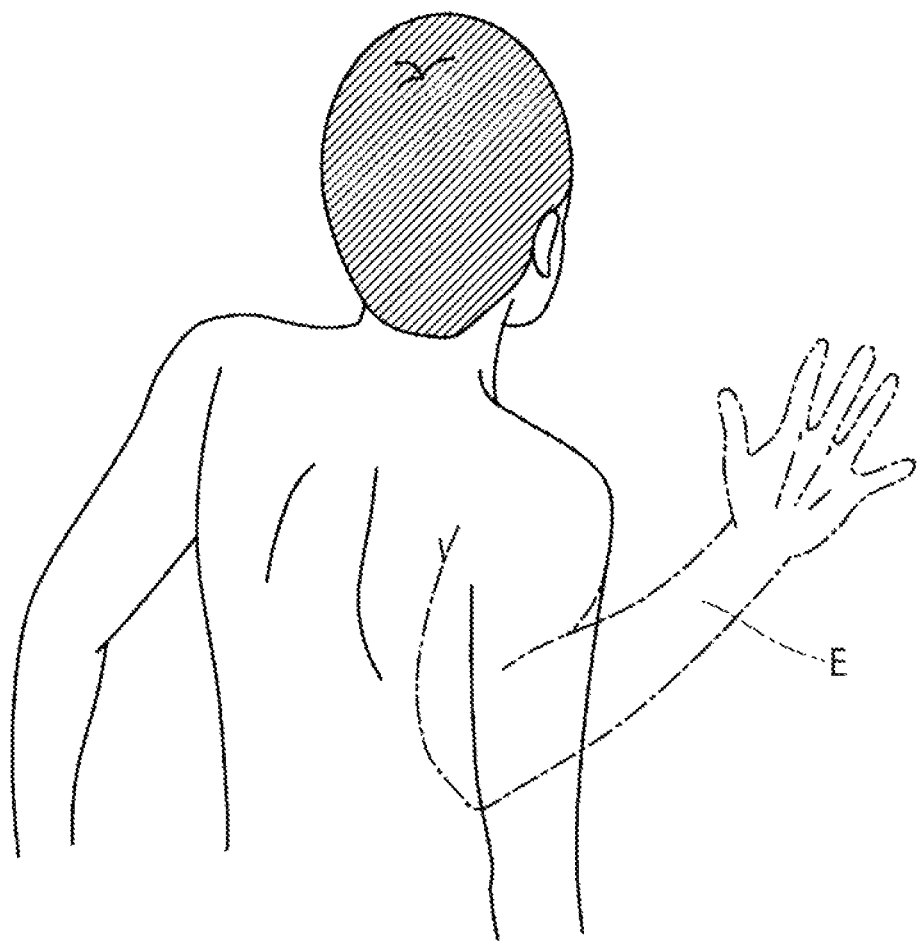
FIG. 6 is a diagram illustrating an extra part.

FIG. 6 illustrates an extra part E. In the present embodiment, the actual extra part E is not used. That is, the extra part E illustrated in FIG. 6 indicates an image imaged by the examinee or an image viewed by the examinee through the HMD 100. In this embodiment, the extra part E is a third arm. The third arm as used here is derived from the back of the right shoulder, and is an imaginary body part including the upper arm, the forearm, and the hand. The hand as used here is a part from the wrist to the fingertip, and includes five fingers, a palm of the hand, and the back of the hand.

In S400, the examinees were instructed to imagine that extra parts E are generated in their bodies and operating the extra part E with their own will, from those who assist training (hereinafter referred to as assistants).

Figure 7:
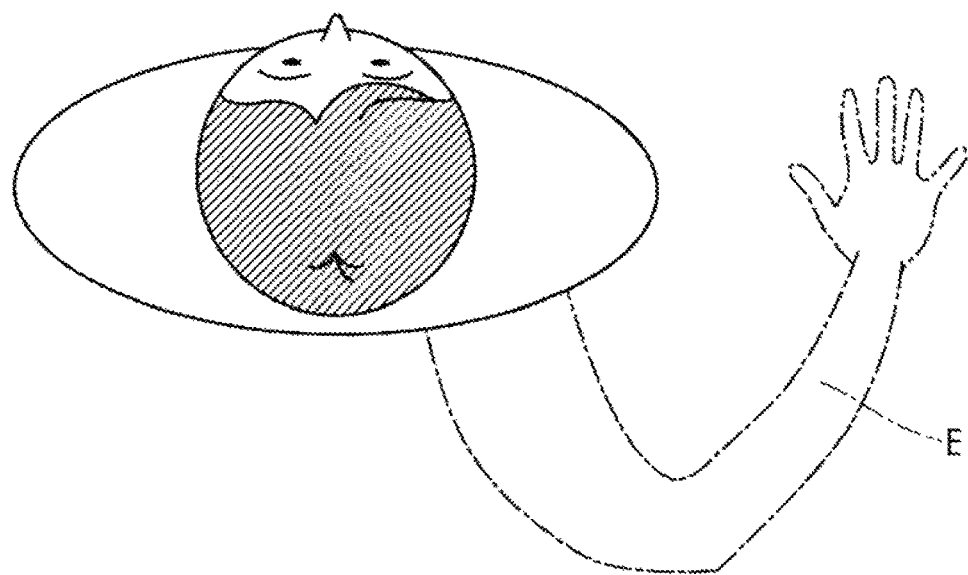
FIG. 7 is a diagram illustrating an imaginary repetitive motion of the extra part.
Figure 8:
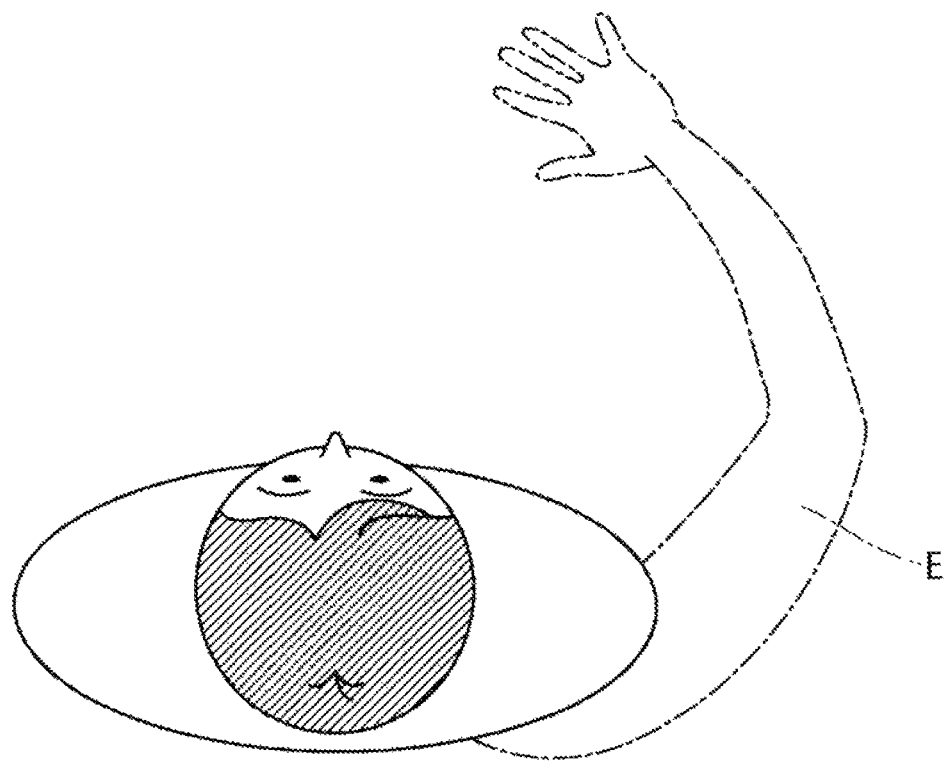
FIG. 8 is a diagram illustrating another imaginary repetitive motion of the extra part.

FIG. 7 and FIG. 8 illustrate imaginary repetitive motions of the extra part E. As illustrated in FIG. 7 and FIG. 8, in S400, the examinee imagines moving the extra part E front and rear.

Figure 9:
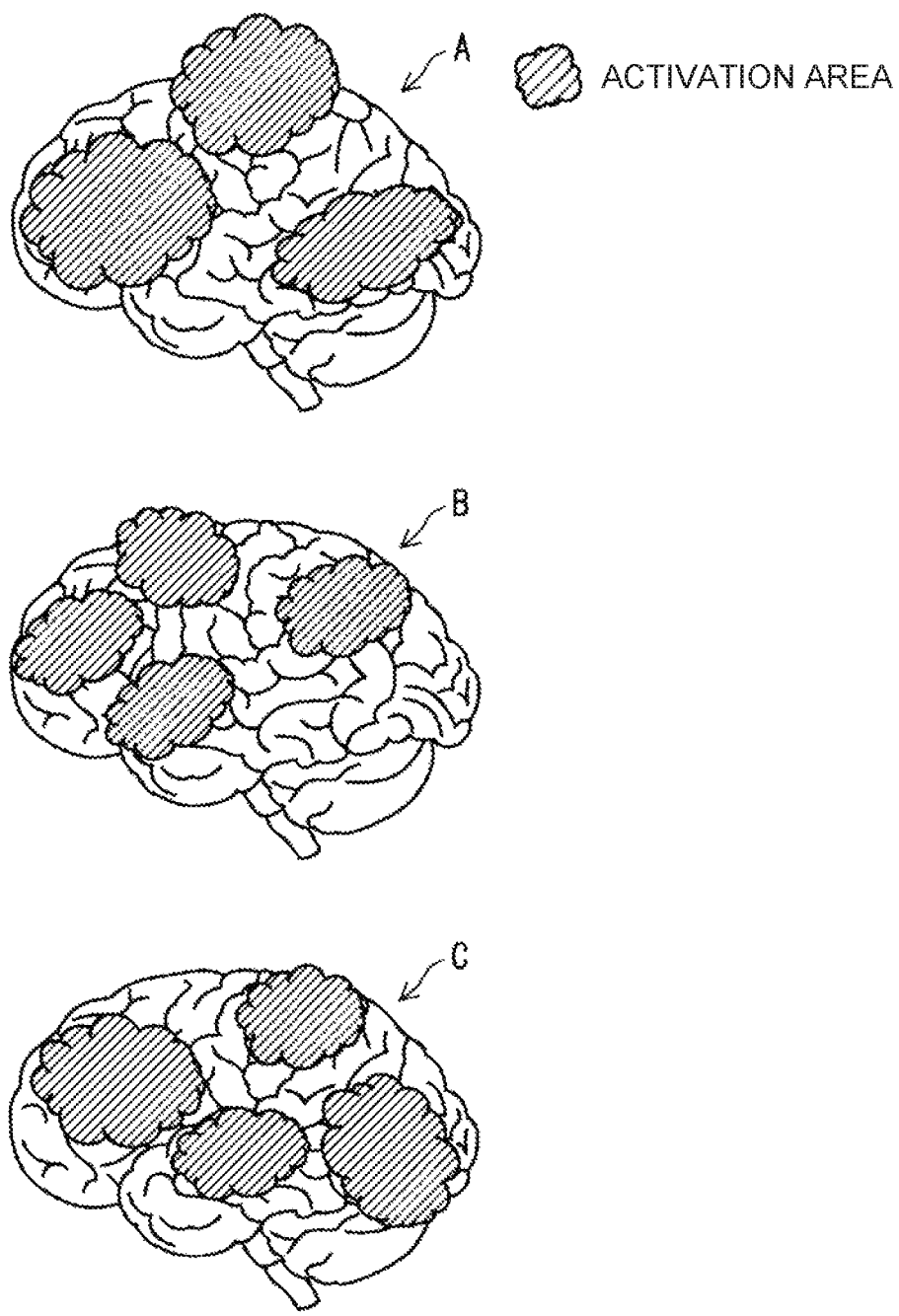
FIG. 9 is a diagram schematically illustrating an activation area of a brain before training.

FIG. 9 schematically illustrates activation areas of the brains before training, with respect to three examinees A, B, and C. The activation area is an active brain area. Specifically, the activation area is a brain area in which an increase in blood flow occurs, or brain cell ignition (spike) occurs actively.

As illustrated in FIG. 9, before the training, the activation areas of the examinees A, B, and C are different from each other. Furthermore, in the case of examinees A, B, C-person-person, the activation area is wide.

As described above, the occurrence of individual differences in the activation areas or the expansion of the activation areas over a wide range is a phenomenon that may be observed when an unaccustomed operation is performed.

Figure 10:
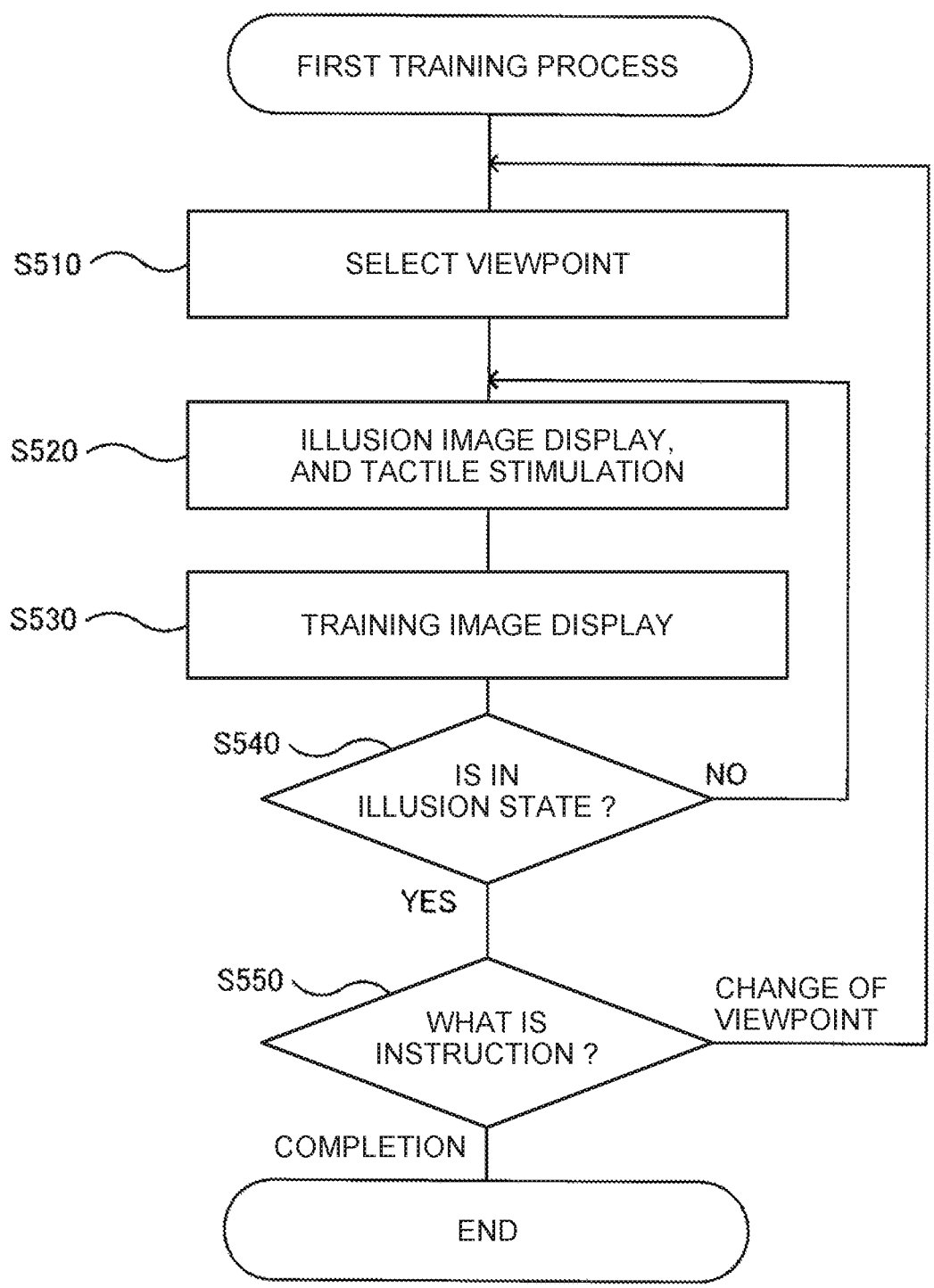
FIG. 10 is a flowchart illustrating a first training process.

Subsequently, the first training process (S500) is executed. FIG. 10 is a flowchart illustrating the procedure of the first training process. The operation of the HMD 100 in the first training process is realized by the CPU 140 executing the program stored in the storage 120. The HMD 100 displays the display image in the first training process, by playing the scenario stored in the scenario database 138. The HMD 100 starts the first training process, with the instruction input through the operation unit 135 as a trigger. The examinee performs an input operation on the operation unit 135 in response to the instruction of the assistant.

First, a viewpoint is selected (S510). S510 is realized by the examinee operating the operation unit 135. The examinee performs an input operation on the operation unit 135 in response to the instruction of the assistant. In the present embodiment, a first person viewpoint and a plurality of third person viewpoints are prepared.

Figure 11:
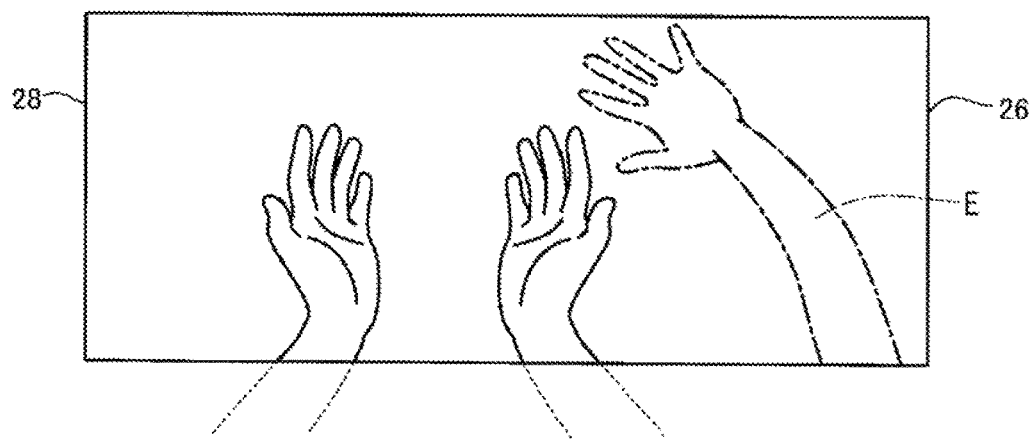
FIG. 11 is a diagram illustrating a first image.

FIG. 11 illustrates a display image (a first image) when the first person viewpoint is selected. The first person viewpoint is the actual viewpoint of the examinee. A rectangle drawn with a solid line indicates a boundary between the optical image display units (the right optical image display unit 26 and the left optical image display unit 28) viewed by the examinee.

The examinee views the extra part E as the display image (first image). In other words, the examinee experiences the augmented reality by the first image.

Both hands drawn by solid lines are the examinee's own hands seen through the optical image display unit. The forearm drawn by a broken line is the examinee's own forearm which is viewed without passing through the optical image display unit. His/her own body which is seen through the optical image display unit is not a display image.

Figure 12:
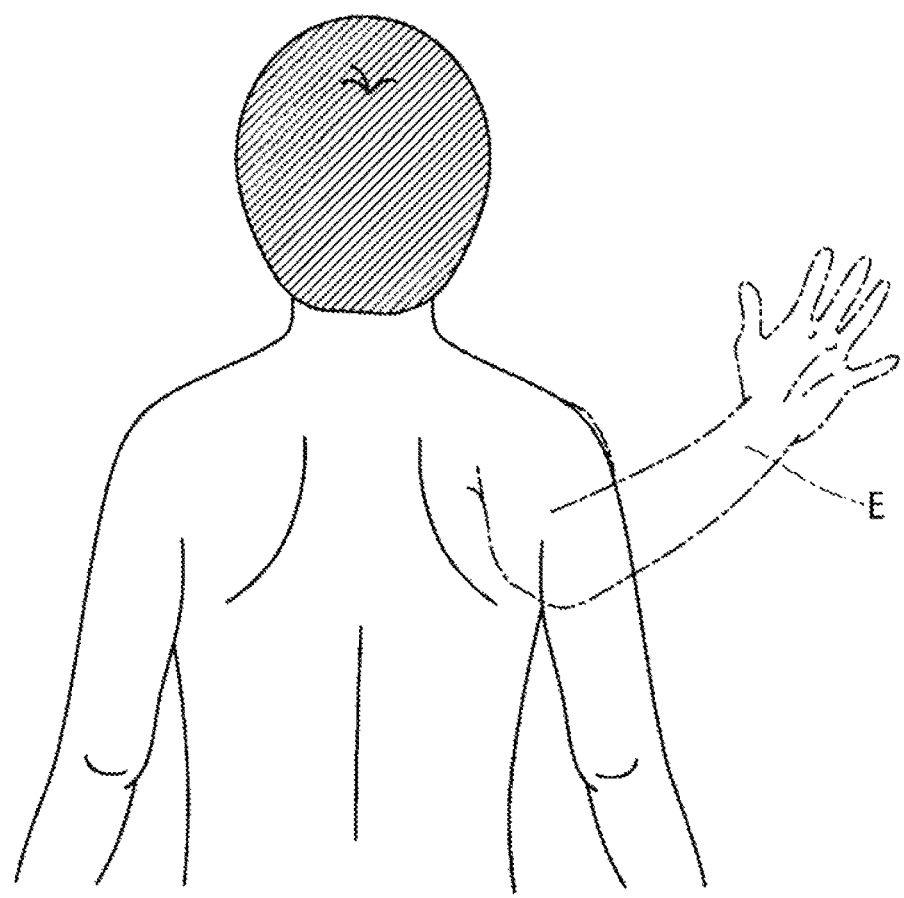
FIG. 12 is a view illustrating an image from a rear viewpoint.
Figure 13:
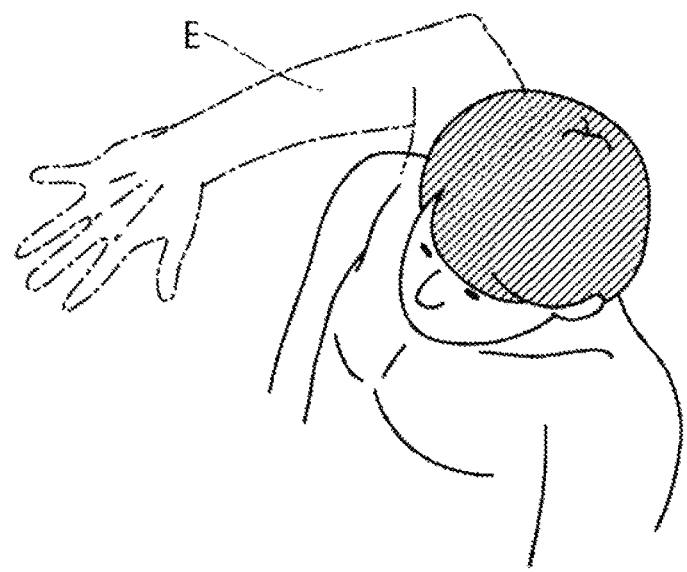
FIG. 13 is a view illustrating an image from a front viewpoint in an upper diagonal direction.

On the other hand, the third person viewpoint is used to view examinee's own body from a third person, as exemplified in FIGS. 6, 7, and 8. In other words, the display image (second image) based on the third person viewpoint gives an examinee a feeling of viewing his/her own body as if he/she withdraws from the body. Therefore, it is possible for the examinee to view the image of the back, which is difficult to be viewed directly with the naked eye. The viewpoint illustrated in FIG. 6 is selectable in S510, and is a rear viewpoint in an upward diagonal direction. The viewpoints illustrated in FIG. 7 and FIG. 8 are selectable in S510, and are viewpoints in an upward direction. FIG. 12 illustrates a rear viewpoint as another viewpoint selectable in S510. FIG. 13 illustrates a front viewpoint in an upper diagonal direction as another viewpoint selectable in S510. In S510, any one of these viewpoints is selected. In S510, the display image described so far is not yet displayed.

Figure 14:
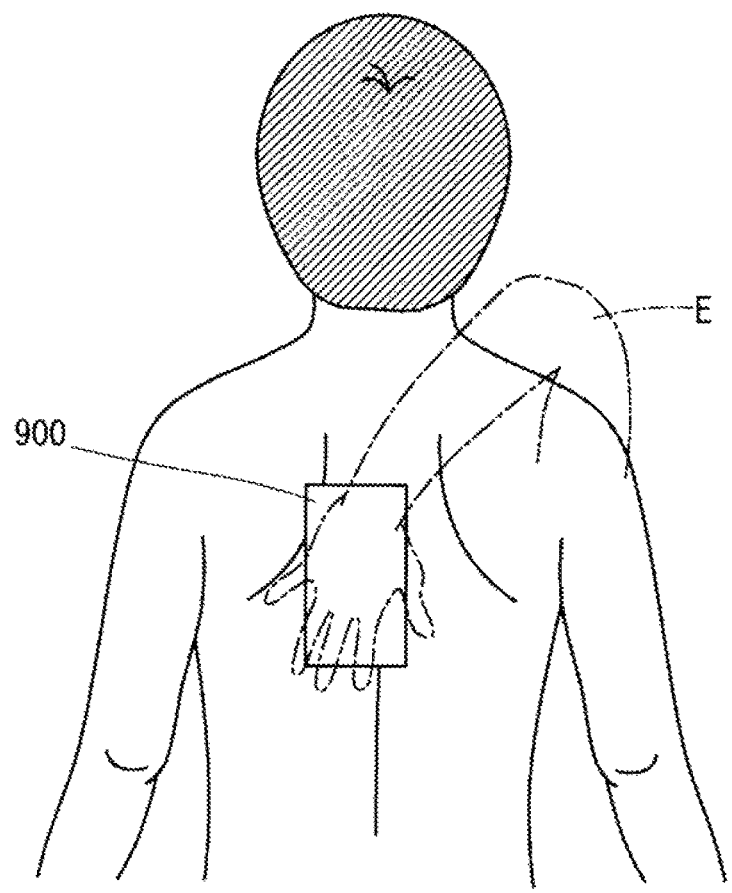
FIG. 14 is a diagram illustrating an illusion image.

If the viewpoint is selected, display of an illusion image and tactile stimulation are performed (S520). FIG. 14 illustrates an illusion image. Regardless of the selection in S510, an image illustrated in FIG. 14 is displayed as a display image from the rear viewpoint, as the illusion image. The stimulation device 900 illustrated in FIG. 14 is not displayed on the illusion image, but is illustrated in FIG. 14 for the purpose of explanation. The stimulation device 900 is attached to the examinee's back in advance.

The illusion image is a moving image in which the extra part E appears to come into contact with or release from the back as the tactile organ of the examinee. Then, at a timing when the extra part E appears to come into contact with the back of the examinee, tactile stimulation is applied to the back of the examinee by the stimulation device 900. The stimulation device 900 applies tactile stimulation to the examinee, by generating vibration. The stimulation device 900 is wirelessly connected to the controller 10, and acquires from the controller 10, information indicating the timing at which the extra part E appears to be touching the examinee's back, thereby realizing the vibration at the above timing.

S520 is a step for causing the examinee to feel illusion. The illusion used herein is that the examinee feels the extra part E as a part of his/her own body. Training in a state that the examinee feels illusion as described above (hereinafter, illusion state) increases the effect of training. S520 is completed after a predetermined time from the start.

Subsequently, display of the training image is started (S530). The training image is an image from the viewpoint selected in S510, and is a moving image in which the extra part E is operating. The operation of the extra part E is, for example, the operation illustrated in FIGS. 7 and 8 in the case of a viewpoint in an upward direction. In S530, the examinee is instructed by the assistant to imagine that the extra part E to be viewed is to operate on his/her own will.

Next, the assistant determines whether or not the examinee is in an illusion state (S540). The assistant executes S540 during display of the training image. The assistant observes the electroencephalogram acquired by the electroencephalogram monitor 300 and determines whether or not the examinee is in an illusion state. Waveforms peculiar to electroencephalograms are known to appear in the illusion state. The assistant performs S540 based on the presence or absence of this waveform.

The assistant displays information indicating the activation area acquired by the electroencephalogram monitor 300, on the monitor of the PC as an image, for the purpose of S540. In the image to be displayed, the activation area is highlighted by color coding or the like. For this image, a standard brain is used. The standard brain is an image of a brain prepared in advance as an average brain. The PC executes a process of fitting the information acquired by the electroencephalogram monitor 300 to the case of the standard brain.

If the assistant determines that it is not in an illusion state (NO in S540), the assistant instructs the examinee to return to S520 and repeat to display the illusion image and apply the illusionary stimulation, by operating the operation unit 135.

On the other hand, if it is determined that it is in an illusion state (YES in S540), the assistant does not give an instruction to the examinee, continues the display of the training image to continue training.

If the examinee instructs change of the viewpoint by operating the operation unit 135 according to the instruction of the assistant, while the display of the training image is continued (change of viewpoint in S550), the process returns to S510 and the viewpoint is selected again. The assistant observes the electroencephalogram during training and instructs the viewpoint to be changed as appropriate so that training can be performed more effectively.

If the examinee instructs the completion of the training by operating the operation unit 135 according to the instruction of the assistant, while the display of the training image is continued (completion in S550), the first training process is completed.

If the first training process is ended, as a measurement procedure, the electroencephalogram of the examinee when the examinee imagines operating the extra part E with his/her own will is acquired (S600). S600 is a step having the same contents as S400.

Subsequently, as an effect measurement procedure, the assistant determines whether or not the activation area is converged (S700). The assistant sees the image representing the activation area, and determines whether or not the activation area is converged, by using the following standard. The standard includes whether or not the activation area of the examinee to be determined is roughly the same as the activation areas of other examinees of a predetermined number of people or more, and whether or not the activation area is narrower than before the training.

Figure 15:
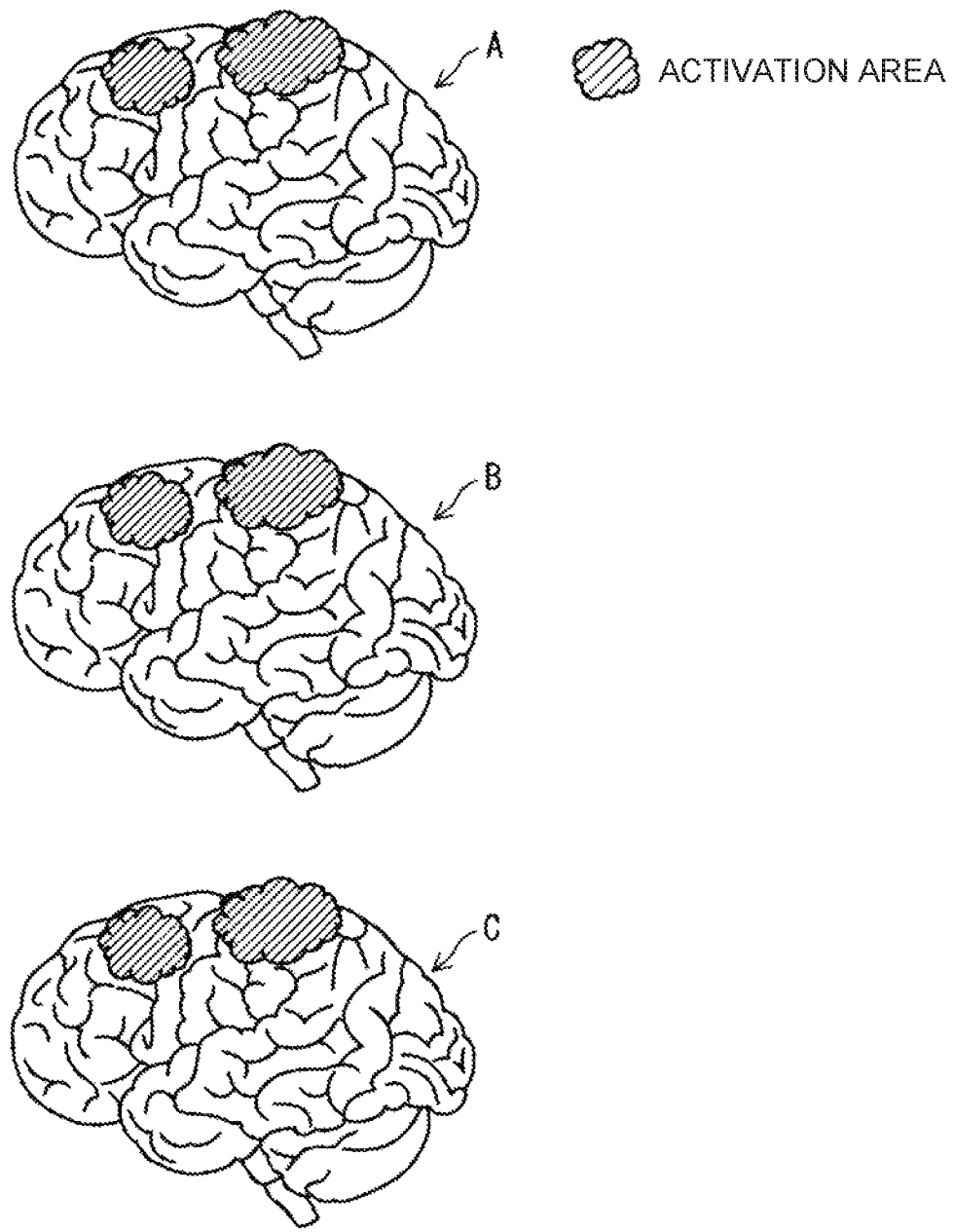
FIG. 15 is a diagram schematically illustrating an activation area after training.

FIG. 15 schematically illustrates activation areas which are converged, with respect to three examinees A, B, and C. In the case illustrated in FIG. 15, the activation areas of the brains of the examinees A, B, and C are roughly the same, and the activation areas are narrower than before the training. In such a state, the assistant determines that the activation area is converged for each of the examinees A, B, and C.

As described above, it is thought that the reason why the activation areas are approximately the same after training is that there is hardly individual difference in the brain area where the brain area to be activated to operate a certain body part in the primary motor cortex. From the results illustrated in FIG. 15, it can be said that there is hardly any individual difference even if it is a third arm that does not actually exist.

In addition, it is considered that the reason why the activation area becomes narrower than before training is getting accustomed to imagining the operation by training. It is said that the degree of activation of the entire brain decreases as an examinee gets used to an operation, in training of actually operating the examinee's body, as a different training from the present embodiment. In other words, if the examinee gets accustomed to the operation, the operation is realized by local activation in the primary motor cortex, and the burden on the brain can be reduced. From the results illustrated in FIG. 15, it can be said that the same phenomenon can be seen even in the case of the extra part E.

If the assistant determines that the activation area is not converged (NO in S700), the process returns to S500, and the first training process (S500) is executed again. On the other hand, if the assistant determines that the activation area is converged (YES in S700), the effect of the first training process is checked in the effect measurement procedure (S700).

Thereafter, as a specific procedure, a brain area corresponding to the extra part E which is the third arm is specified from the measurement result illustrated in FIG. 15 (S800). Specifically, the brain area activated in the measurement procedure (S600) after the training is specified as the brain area corresponding to the extra part E. Hereinafter, the brain area specified in this manner is referred to as a corresponding area.

Figure 16:
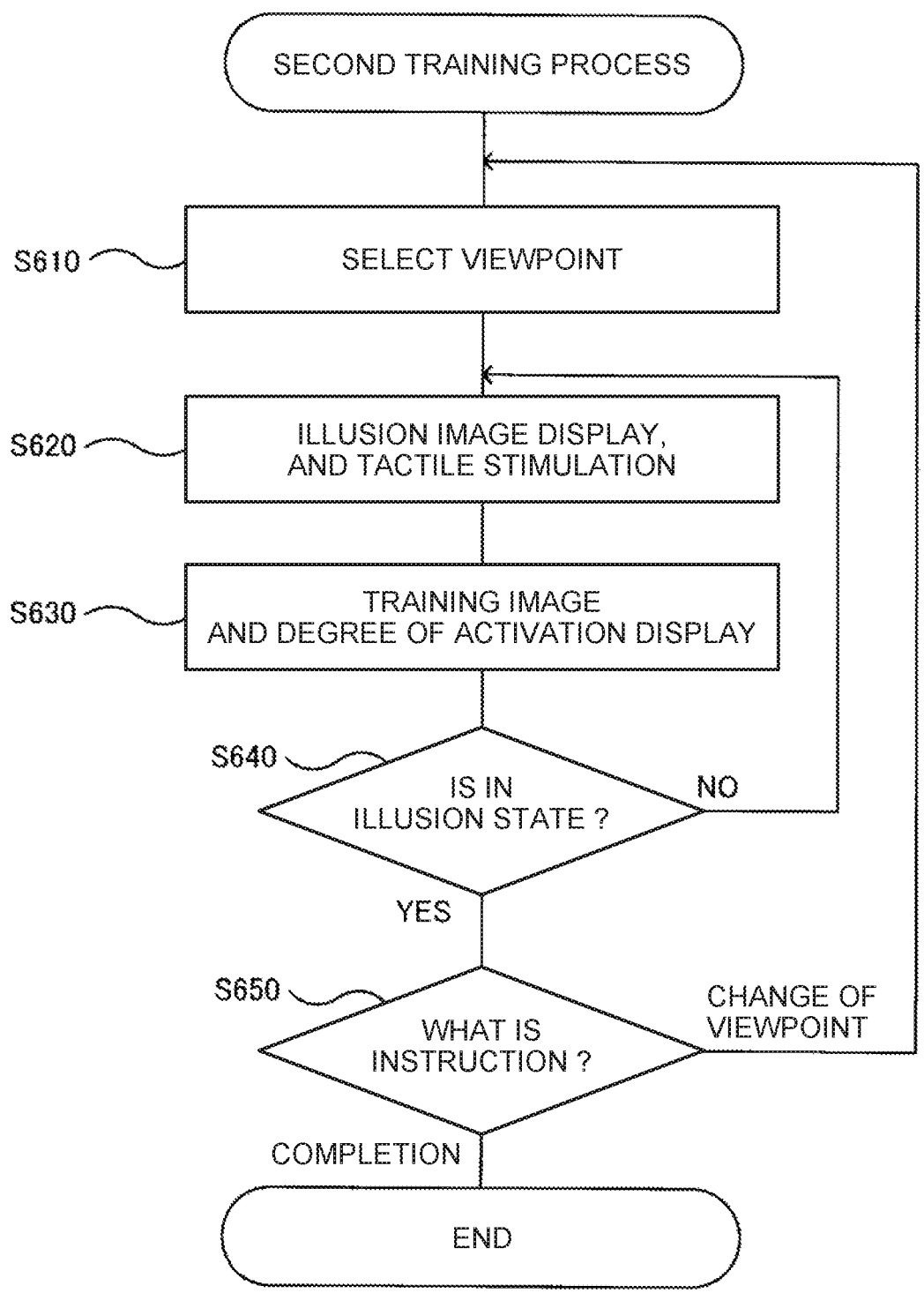
FIG. 16 is a flowchart illustrating a second training process.

FIG. 16 is a flowchart illustrating the procedure of the second training process. The second training process is executed after the activation area is specified by the corresponding area specifying process. The second training process is similar to the first training process, and the steps having the last two digits of the step number have substantially the same contents. In the following description, contents not specifically described are the same as in the first training process.

The operation of the HMD 100 in the second training process is realized by the CPU 140 executing the program stored in the storage 120. The HMD 100 displays the display image in the second training process, by playing the scenario stored in the scenario database 138. The HMD 100 starts the second training process, with the instruction input through the operation unit 135 as a trigger. Since the examinee is accustomed to the handling of the HMD 100 through the first training process, he/she voluntarily executes an input operation for the operation unit 135.

First, a viewpoint is selected (S610). The selection of the viewpoint is the same as in the first training process. When the viewpoint is selected, display of an illusion image and tactile stimulation are executed (S620). The display of the illusion image and the tactile stimulation are also the same as in the first training process.

Subsequently, display of the training image (see FIG. 17) is started (S630). An indication of a degree of activation is included in the training image in the second training process, in addition to the moving image of the extra part E in the first training process. Here, the degree of activation used herein is the degree of activation of the corresponding area. The degree of activation is an index indicating the state of the brain activity of the user who imagines trying to operate the extra part E.

Figure 17:
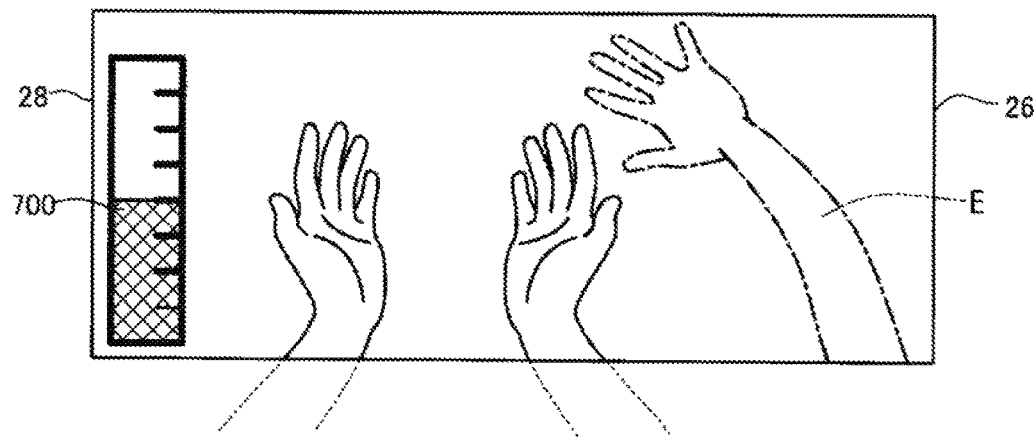
FIG. 17 is a diagram illustrating a training image in the second training process.

FIG. 17 exemplifies a training image in the second training process. FIG. 17 illustrates a training image when the first person viewpoint is selected. This training image includes a gauge 700 as an indication of the above-mentioned degree of activation. The gauge 700 becomes longer as the degree of activation increases, and becomes shorter when the degree of activation decreases.

In the configuration in which the actual extra part E is operated based on the brain activity of the corresponding area, it is preferable that there is a difference in the brain activity of the corresponding area as much as possible between the case where the user imagines trying to operate the extra part E and the case where the user does not imagine trying to operate the extra part E.

Therefore, training is performed in order to generate a difference in the brain activity of the corresponding area as much as possible between the case where the user imagines trying to operate the extra part E and the case where the user does not imagine trying to operate the extra part E, by allowing the examinee to view the degree of activation of the corresponding area.

The controller 10 acquires information indicating the degree of activation of the corresponding area from the PC through wireless communication. The PC extracts information indicating the degree of activation of the corresponding area, from the information acquired from the detection circuit 320 of the electroencephalogram monitor 300, and inputs it to the controller 10.

Next, the examinee himself determines whether or not the examinee is in an illusion state (S640). The determination method is the same as S540.

If it is determined that it is not in an illusion state (NO in S640), the examinee operates the operation unit 135, thereby returning to S620 to repeat the display of the illusion image and the application of the illusion stimulation. On the other hand, if it is determined that it is in the illusion state (YES in S640), the display of the training image is continued and the training is continued.

If the change of the viewpoint is instructed by the examinee operating the operation unit 135 while the display of the training image is continued (change of viewpoint in S650), the process returns to S610 and the viewpoint is selected again. The examinee observes the electroencephalogram during training on the monitor of the PC, and changes the viewpoint as appropriate so that training can be performed more effectively.

If the completion of training is instructed by the examinee operating the operation unit 135 while the display of the training image is continued (completion in S650), the second training process is completed.

According to the above-described embodiment, at least the following effects can be achieved.

The corresponding area can be specified by the first training process. Since the corresponding area can be specified, it is possible to construct a system that allows the user to operate the actual extra part E based on the degree of activation of the corresponding area.

Furthermore, the examinees who have undergone the first training process can operate the actual extra parts E with their electroencephalogram. Since such a system controls the operation of the extra part by the local electroencephalogram in the primary motor cortex, differently from the configuration of detecting the intention of the user based on the activity of the entire brain in the related art, thereby controlling the operation more accurately than in the past.

It is possible to perform training of increasing the degree of activation of the corresponding area, by the second training process. In turn, the operation of the actual extra part E can be more precisely controlled.

The training contents of the first and second training processes can be executed without using the actual extra part E. Therefore, training can be easily performed.

Since the HMD 100 is used, the augmented reality caused by the first image, or the visualization of the operation of a part which cannot be normally viewed due to the second image can be used for training. Therefore, effective training can be performed.

Since the illusion feeling is strengthened in combination with the tactile stimulation, it is possible to perform the training more effectively.

The invention is not limited to the embodiments, examples, and modification examples of the present specification, and can be realized in various configurations without departing from the spirit thereof. For example, the technical features in the embodiments, examples, and modification examples corresponding to the technical features in each aspect described in the part of summary of the Invention can be replaced or combined as appropriate, in order to solve some or all of the above-mentioned problems, or in order to achieve some or all of the aforementioned effects.

Unless its technical features are described as essential here, the features can be deleted as appropriate. For example, the followings are exemplified.

Figure 18:
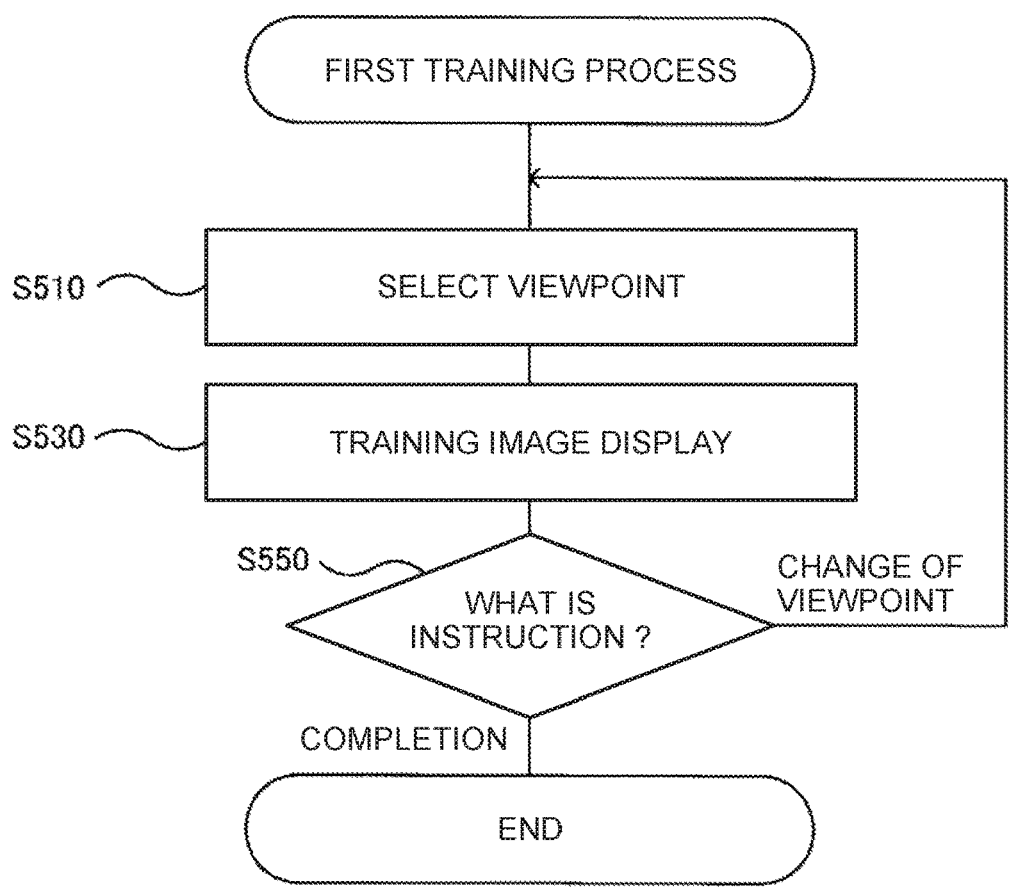
FIG. 18 is a flowchart illustrating the first training process (modification example).

FIG. 18 is a flowchart illustrating a first training process as a modification example. In the case of the modification example, unlike the embodiment, S520 and S540 are not included. That is, it does not include a step for causing an illusion. Even though these steps are not included, it is possible to cause illusion by the first and second images. Therefore, when performing the first training process conveniently, S520 and S540 may be omitted as illustrated in FIG. 18.

The third arm which is an extra part may be connected to any part of the body. For example, it may be connected to the left shoulder, belly, feet, or the like.

The extra part may be imaginary body parts other than the third arm. For example, it may be a tail, a wing, a third foot, a wheel, an endless track, or the like. The wings may have a flapping structure like a wing of a bird, for example, or a structure like a helicopter rotating wing.

The extra part may be prosthesis (prosthetic hands or prosthetic feet) that supplement the missing limbs, prosthetic eyes functioning as a sensory organ, or the like. This prosthetic eye may be configured to operate to move the line of sight.

The method for determining the degree of activation of brain activity may be changed. For example, the degree of activation of the electrical activity of the brain may be used by using magneto encephalography (MEG), or it may be determined based on the amount of cerebral blood flow. For measurement of cerebral blood flow, for example, near-infrared spectroscopy (NIRS) may be used, or functional magnetic resonance imaging (fMRI) may be used.

During training using the HMD, the brain activity of the examinee may not be measured. In this way, even in the case of using a measuring device (such as fMRI) that it is difficult to be used simultaneously with the HMD, the first and second training processes can be easily performed.

The effect measurement procedure (S700) and the specification procedure (S800) may be performed during the first training process. For example, even when the specific procedure is performed during the first training process, for example, the examinee which is to be subjected to the specific procedure is a user who has undergone training to imagine operating the extra part as in the embodiment.

The stimulation device 900 may apply thermal stimulation (temperature stimulation) instead of pressure stimulation by vibration, contact, or the like as tactile stimulation to the examinee. Alternatively, both the pressure stimulation and the temperature stimulation may be applied. In order to apply thermal stimulation, it is possible to adopt a configuration in which the stimulation device 900 includes a heat generating device such as a heater, or a cooling device such as a Peltier device or a water cooling device.

The stimulation applied to the examinee may be stimulation (that is, sound) to the auditory organ. For example, when an extra part operates as the third arm, a wind noise may be heard by the examinee. Such a sound may be realized by using an earphone provided in the HMD. The stimulation to the auditory organ may be combined with the display of the illusion image or may be performed instead of the display of the illusion image.

Stimulation for illusion may be applied by an assistant. For example, when applying tactile stimulation, the assistant may touch the examinee's back, at the timing when the extra part appears to touch the examinee's back. The HMD may output to the external wireless communication device, information indicating the timing at which the extra part appears to touch the examinee's back. An assistant may apply tactile stimulation, with reference to its output.

The illusion image may be an image based on a first person viewpoint. For example, it may be an image that the extra part appears to touch the examinee's arms.

The preliminary measurement procedure (S400) may not be performed. In this case, the effect measurement procedure may be performed based on whether or not the activation area of the examinee to be determined is approximately the same as the activation area in other examinees of a predetermined number of people or more.

An apparatus causing the examinee to view the display image in the first and second training processes may be a non-transparent head mounted display or a liquid crystal display. In the case of using these devices, the first image may be used.

In the case of using a non-transparent head mounted display, the first image may not be displayed, or the user's body may be displayed as the first image, in addition to the extra part.

In order to allow the examinee to view the display image in the first training process while measuring the brain activity of the examinee by fMRI, an image may be transmitted from the outside using an optical fiber, and displayed on a display device provided in the fMRI (a liquid crystal display or the like).

In the second training process, the mode of displaying information indicating the degree of activation of the corresponding area may be changed. For example, the information may be displayed by the angle of a rotating needle, or it may be displayed as a numerical value.

In the second training process, the user may be notified of the information indicating the degree of activation of the corresponding area in a mode other than display by the HMD. For example, another display device (a liquid crystal display or the like) may be used as a notifying unit, and information may be displayed on the display device so that the user can view it.

Alternatively, a sound output device outputting sound may be used as the notifying unit. That is, the HMD or another device may output the sound as the information indicating the degree of activation of the corresponding area. For example, as the degree of activation becomes higher, the higher tone or the loud sound may be output.

In response to an instruction of the assistant, the operations described as being performed by the examinee may voluntarily be performed by the examinee.

The steps described as being performed by the assistant may be executed by the HMD or by a computer as an external device.

The entire disclosure of Japanese Patent Application No. 2016-031555 filed Feb. 23, 2016 is expressly incorporated by reference herein.

What is claimed is:

1. A training device comprising:
  a sensor configured to:
    detect one of an electrical signal, a magnetic signal, an electro-magnetic signal, or an optical signal indicating an amount of a blood flow or a cell ignition in brain areas of a brain of a user; and
    output a sensor result based on the detected signal;
  a memory configured to store the sensor result and computer-readable instructions;
  a display configured to display a notification image and a user activity image, the user activity image showing an extra part shown overlapping a first actual body part of the user, and showing a second actual body part of the user;

a stimulation device configured to generate a vibration, the stimulation device being configured to be attached to the second actual body part of the user, the stimulation device being configured to apply the vibration to the second actual body part of the user; and a processor configured to execute the computer-readable instructions so as to:

display, on the display, the user activity image from a viewpoint that shows the extra part moving with respect to the second actual body part of the user;

determine a timing at which the extra part and the second actual body part of the user come into contact with each other in the user activity image from the viewpoint;

cause the stimulation device to generate the vibration to the second actual body part of the user when the processor determines the timing;

determine, using the sensor result, an area within the brain based on the amount of the blood flow or the cell ignition, the determined area indicating where a brain activity occurs when the user activity image is displayed; and display (i) the notification image indicating a degree of the brain activity of the determined area in the brain based on the sensor result and (ii) the user activity image on the display together so as to show a degree of an illusion of the user, the illusion of the extra part being a part of the body of the user.

2. The training device according to claim 1,
wherein the training device is a head mounted display, and the processor is configured to cause the display to display a virtual image for the user.

3. The training device according to claim 1,
wherein the processor is configured to cause the display to display a first image of the user activity image and a second image of the user activity image,
the processor is configured to create the first image from a viewpoint of the user, and
the processor is configured to create the second image from a viewpoint of a different person who observes the user.

4. The training device according to claim 3,
wherein the training device is a transparent head mounted display, and
wherein the first image is an image in which the extra part appears to be disposed relative to the body of the user.

5. The training device according to claim 1,
wherein the processor is configured to cause the display to display the user activity image in which the extra part appears to apply the vibration, when the vibration is applied to at least one of a tactile organ and an auditory organ of the user as the second actual body part of the user.

6. A training method for causing a processor to execute computer-readable instructions stored in a memory, the method comprising executing on the processor the steps of:

detecting one of an electrical signal, a magnetic signal, an electro-magnetic signal, or an optical signal indicating an amount of a blood flow or a cell ignition in brain areas of a brain of a user so as to output a sensor result based on the detected signal;

displaying, on a display, a user activity image showing an extra part shown as overlapping a first actual body part of the user, and showing a second actual body part of the user, the user activity image being displayed from a viewpoint that shows the extra part moving with respect to the second actual body part of the user;

determining a timing at which the extra part and the second actual body part of the user come into contact with each other in the user activity image from the viewpoint;

causing a stimulation device to generate a vibration to the second actual body part of the user when the processor determines the timing;

determining, using the sensor result, an area within the brain based on the amount of the blood flow or the cell ignition, the determined area indicating where a brain activity occurs when the user activity image is displayed; and displaying (i) a notification image indicating a degree of the brain activity of the determined area in the brain based on the sensor result and (ii) the user activity image on the display together so as to show a degree of an illusion of the user, the illusion of the extra part being a part of the body of the user.

7. A computer program product embodying computer-readable instructions stored on a non-transitory computer-readable medium in which a program stored for causing a computer to execute a process by a processor for a training device so as to perform the steps of:

detecting one of an electrical signal, a magnetic signal, an electro-magnetic signal, or an optical signal indicating an amount of a blood flow or a cell ignition in brain areas of a brain of a user so as to output a sensor result based on the detected signal;

displaying, on a display, a user activity image showing an extra part shown as overlapping a first actual body part of the user, and showing a second actual body part of the user, the user activity image being displayed from a viewpoint that shows the extra part moving with respect to the second actual body part of the user;

determining a timing at which the extra part and the second actual body part of the user come into contact with each other in the user activity image from the viewpoint;

causing a stimulation device to generate a vibration to the second actual body part of the user when the processor determines the timing;

determining, using the sensor result, an area within the brain based on the amount of the blood flow or the cell ignition, the determined area indicating where a brain activity occurs when the user activity image is displayed; and displaying (i) a notification image indicating a degree of the brain activity of the determined area in the brain based on the sensor result and (ii) the user activity image on the display together so as to show a degree of an illusion of the user, the illusion of the extra part being a part of the body of the user.

* * * * *